April 22, 1924.

P. V. TIPPET 1,491,768

ROLL ADJUSTING MECHANISM FOR CALENDERS

Filed Nov. 14, 1921     3 Sheets-Sheet 1

INVENTOR.
BY Philip V. Tippet.

Fay, Oberlin & Fay
ATTORNEYS

April 22, 1924.

P. V. TIPPET 1,491,768

ROLL ADJUSTING MECHANISM FOR CALENDERS

Filed Nov. 14, 1921    3 Sheets-Sheet 2

INVENTOR.
Philip V. Tippet,
BY Day, Oberlin & Day
ATTORNEY.

April 22, 1924.

P. V. TIPPET 1,491,768

ROLL ADJUSTING MECHANISM FOR CALENDERS

Filed Nov. 14, 1921

3 Sheets-Sheet 3

INVENTOR.
Philip V. Tippet.
BY
Fay, Oberlin & Fay
ATTORNEYS

Patented Apr. 22, 1924.

1,491,768

UNITED STATES PATENT OFFICE.

PHILIP V. TIPPET, OF CUYAHOGA FALLS, OHIO, ASSIGNOR TO THE VAUGHN MACHINERY COMPANY, OF CUYAHOGA FALLS, OHIO, A CORPORATION OF OHIO.

ROLL-ADJUSTING MECHANISM FOR CALENDERS.

Application filed November 14, 1921. Serial No. 514,916.

*To all whom it may concern:*

Be it known that I, PHILIP V. TIPPET, a citizen of the United States, and a resident of Cuyahoga Falls, county of Summit, and State of Ohio, have invented a new and useful Improvement in Roll-Adjusting Mechanism for Calenders, of which the following is a specification, the principle of the invention being herein explained and the best mode in which I have contemplated applying that principle, so as to distinguish it from other inventions.

The present improvements relate, as indicated, to calenders such as are used, for example, in the rubber industry and more particularly to calenders of the three roll type. Due to the strains imposed upon such calendering machines, they require to be of a heavy and substantial construction and the ready and accurate adjustment of the rolls with respect to each other accordingly becomes a considerable problem.

The object of the present invention is the provision of a motor roll adjusting device for such calender machines with which is combined a device for indicating in one thousandth of an inch if desired, the movement of the rolls. At the same time means are provided for independently adjusting such rolls by hand should for any reason the motor driven adjustment be inoperative.

To the accomplishment of the foregoing and related ends, the invention then consists of the means hereinafter fully described and particularly pointed out in the claims, the annexed drawings and the following description setting forth but one of various mechanical forms in which the principle of the invention may be used.

In said annexed drawings:—

Figure 1:
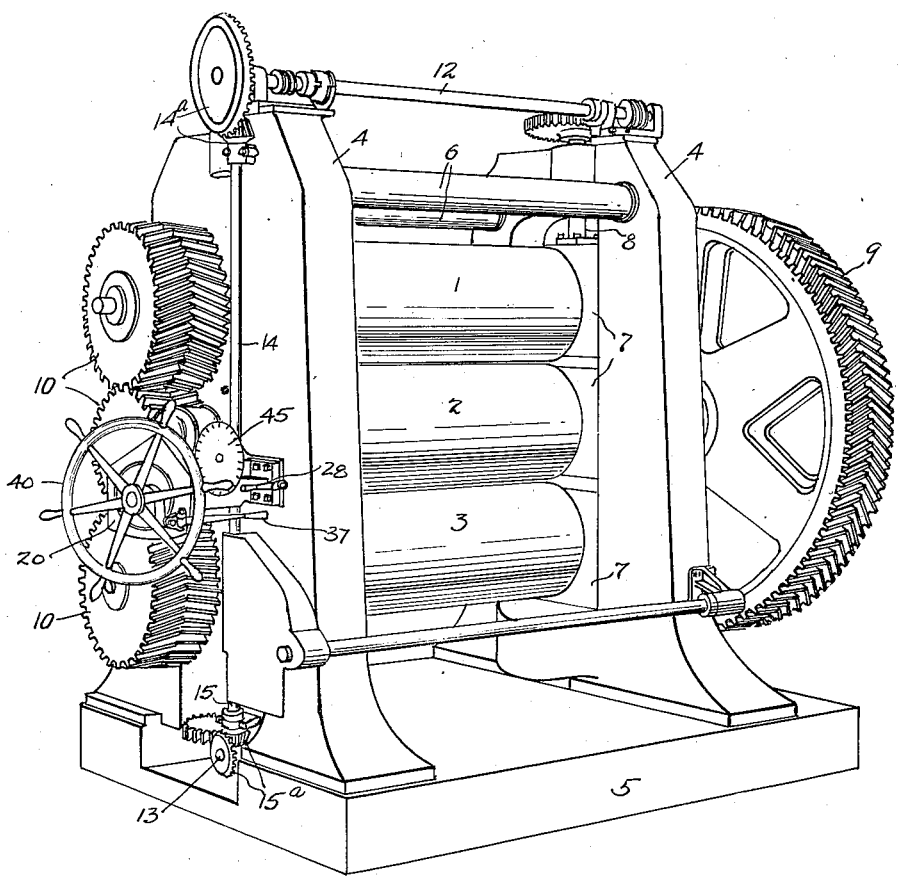
Figure 2:
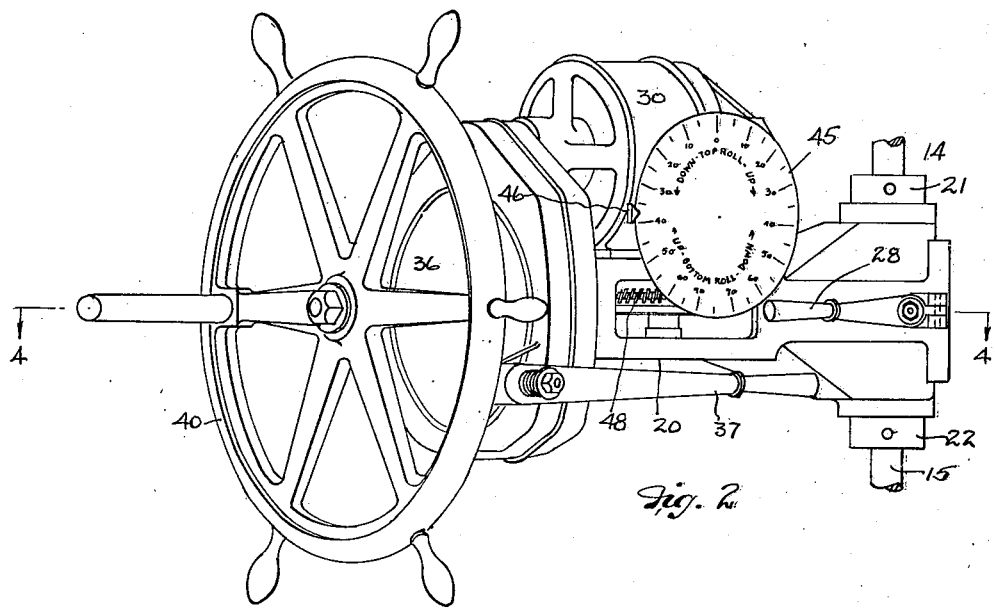
Figure 3:
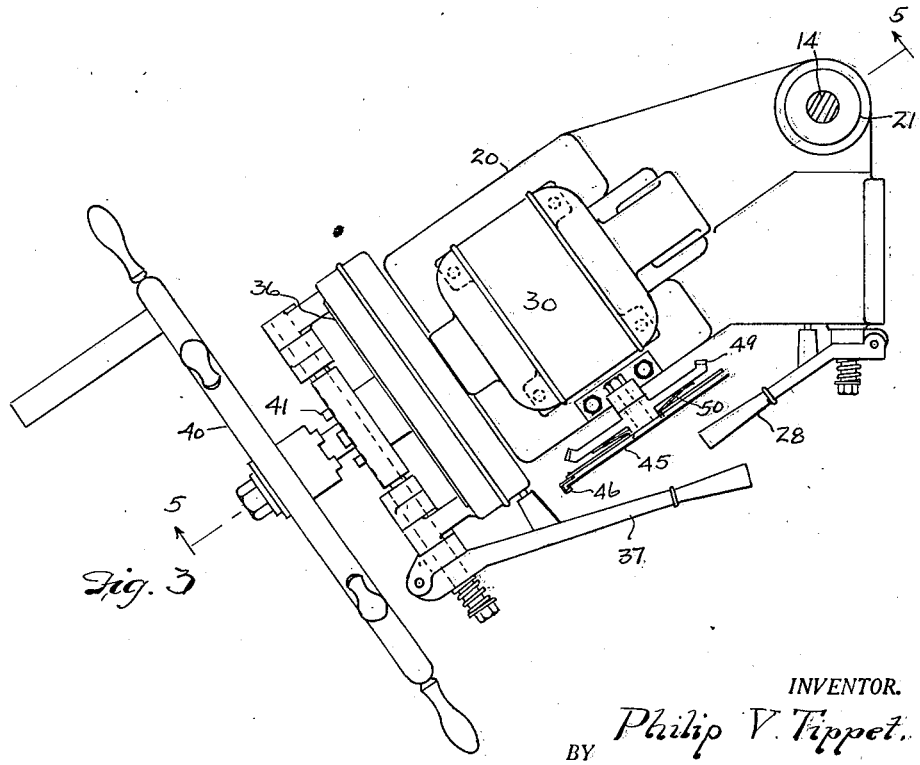
Figure 4:
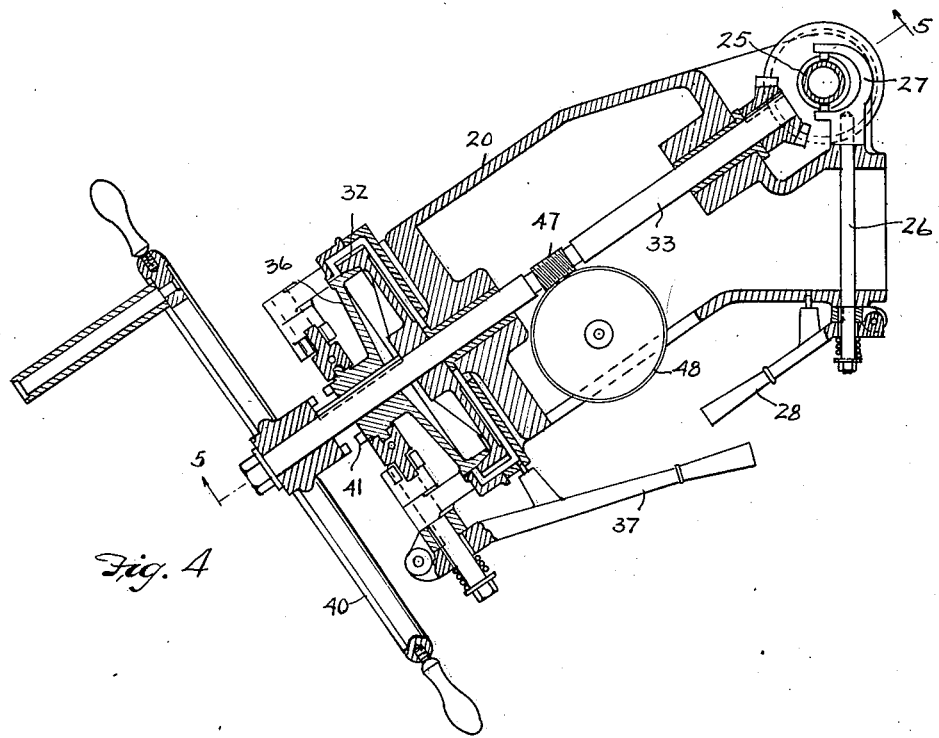
Figure 5:
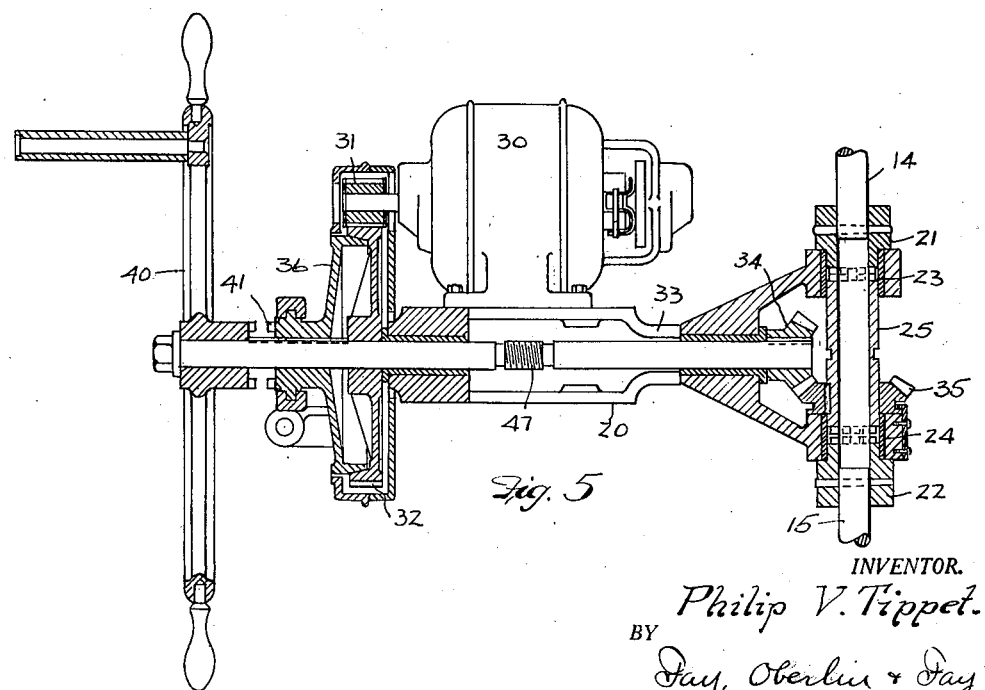

Fig. 1 is a perspective view of a three roll calender equipped with my improved combination roll adjusting and indicating device; Fig. 2 is a front elevation of the essential portions of such device taken by itself and drawn to a somewhat larger scale; Fig. 3 is a plan view of the device as shown in front elevation in Fig. 2; Fig. 4 is a horizontal section of the device taken on the plane indicated by the line 4—4, Fig. 2; and Fig. 5 is a vertical section thereof taken on the plane indicated by the lines 5—5, Figs. 3 and 4.

The general construction of the calendering machine which is of standard type need only be briefly referred to. As shown in Fig. 1, the three rolls 1, 2 and 3, are mounted in superposed relation in heavy vertical frame members 4, 4, that rise from a base 5 and are rigidly secured together by transverse braces 6, 6. The ends of the several rolls are journaled in suitable boxes 7 which in the case of the middle roll 3 are normally fixedly mounted in frame members 4, while the boxes for the upper and lower rolls 1 and 3 are adjustable in said members so as to move the corresponding rolls closer to or farther away from such middle roll. The means for effecting such adjustment of the upper and lower pairs of boxes 7 comprise suitable screws 8 or equivalent gearing of familiar construction, the shaft of only one such screw, viz, that associated with the right hand box of the upper roll 1, appearing in Fig. 1.

The central roll 2 is adapted to be directly driven through the large gear 9 on one end thereof and the upper and lower rolls 1 and 3 are driven from such middle roll through meshed gears 10 on the opposite ends of said rolls.

The adjusting mechanisms 8 for such upper roll are connected to be separately or simultaneously operated by a worm shaft 12 mounted on top of frame members 4, while a similar transverse worm shaft 13 mounted in the bed 5 of the machine serves to separately or simultaneously operate the adjusting mechanisms for the lower roll 3. For rotating said worm shafts 12 and 13, two vertically aligned shafts 14 and 15, respectively, are provided at one end of the machine (the left as shown in Fig. 1), bevel gearing 14ª and 15ª serving to operatively connect said vertical shafts, respectively, with such worm shafts.

The mechanism for in turn rotating the said shafts 14 and 15 is illustrated in detail in Figs. 2 to 5, inclusive, and will now be described. Such mechanism is carried by a bracket 20 projecting laterally from the corresponding frame member 4, the contiguous ends of shafts 14 and 15 being provided with clutch sleeves 21 and 22 that are journaled in suitable bearings 23 and 24 provided in such bracket. In the same bearings there is journaled an independent clutch member 25 which is also capable of a reciprocal movement in such bearings so as to engage either with clutch 21 or clutch 22 as desired. Said clutch member 25 may also occupy an intermediate neutral position, in which it is shown in Fig. 5, its movement being controlled by means of an oscillatory shaft 26 connected at its inner end with said clutch member through the medium of a fork 27 and having an operating handle 28 on its outer end.

Supported on bracket 20 is an electric motor 30 that has driving connection with said clutch member 25 through a spur pinion 31 on its spindle and a spur gear 32 on a shaft 33 the inner end of which carries a bevel gear 34 in mesh with a bevel gear 35 that is keyed on said clutch member 25. Spur gear 32 is not directly rotatively connected with shaft 33 but is adapted thus to be secured thereto by means of a cone friction clutch 36 which is operated by means of a hand lever 37 to connect or disconnect the motor as desired, and which also serves to prevent all danger of damage to the rolls or operating mechanism, should the adjustment of such rolls be carried too far so as to bring them forcibly together.

On the outer end of the horizontal shaft 33 there is also mounted a hand wheel 40 that is normally freely rotatable on said shaft but may be fixedly secured thereto through the medium of a jaw clutch 41 integral with the cone friction clutch 36 and therefore operable by the same hand lever 37 as is such last mentioned clutch. The arrangement, in other words, is such that in addition to occupying a neutral position, the clutches 36 and 41 may be shifted to be alternatively brought into driving connection with spur gear 32 or hand wheel 40. In other words, it is impossible to connect both the hand wheel and the motor to the adjusting shaft 33 at the same time.

There is also mounted on the bracket 20 in front of the horizontal shaft 33 an indicating device consisting of a dial 45, such dial being graduated to indicate in thousandths of an inch the movement of the upper and lower rolls, respectively. An index pointer 46 is adapted to be moved circularly about such dial from the adjusting shaft 33 through the medium of a worm 47 on an intermediate portion of such shaft which drives a worm gear 48 that is in turn connected with said pointer through a bevel gear 49 and a friction plate 50.

The manner in which the adjustment of the rolls 1 and 3 is accomplished by means of the present device should be readily apparent from the foregoing description of the construction of such device and the operation of its component parts. Assuming that it is the top roll which is to be adjusted, the index pointer 46 is moved to zero position at the top of the dial. The clutch member 25 is thereupon shifted into engagement with the clutch sleeve 21 on the lower end of shaft 14 and if the adjustment is extensive enough to require the use of power, the hand lever 37 is moved to throw cone friction clutch 36 into engagement with spur gear 32. The current is thereupon switched on motor 30, the latter being of the reversible type, so as to drive adjusting shaft 33 and thereby said shaft 14 in the proper direction to raise or lower said upper roll as required. The amount of movement of the roll will be exactly indicated on the dial 45 by the movement of the pointer 46 with reference thereto either in a clockwise or counter-clockwise direction. For fine adjustment or in case for any reason the motor drive cannot be used, the hand wheel 40 may be connected with the adjusting shaft 33 by properly shifting lever 37, as previously described, and in the same fashion as before the upper roll moved up or down the required amount.

The operation is identically the same when it is the lower roll to be adjusted except that the index pointer 46 will be brought into proper relation with the dial to indicate movement of this roll and the clutch member is shifted into engagement with clutch sleeve 22 on shaft 15 instead of clutch member 21 on shaft 14.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In roll-adjusting mechanism for calenders and the like, the combination of a suitable support, two shafts for effecting such adjustment having ends journaled in said support, a clutch member lying between such ends and shiftable into engagement with either one thereof as desired, a third shaft journaled in said support and having driving engagement with said clutch member, and indicating means operatively connected with said third shaft and adapted to indicate the amount of movement imparted to either roll through said first-named shafts.

2. In roll-adjusting mechanism for calenders and the like, the combination of a suitable support, two shafts for effecting such adjustment having ends journaled in said support, a clutch member lying between such ends and shiftable into engagement with either one thereof as desired, a third shaft journaled in said support and having driving engagement with said clutch member, and indicating means operatively connected with said third shaft and adapted to indicate the amount of movement imparted to either roll through said first-named shafts, said indicating means including a dial having portions designated for said rolls, respectively, a pointer movable with respect to said dial, and reduction gearing driven by said adjusting shaft and frictionally connected with said pointer.

3. In roll-adjusting mechanism for calenders and the like, the combination of a suitable support, two shafts for effecting such adjustment having ends journaled in said support, a clutch member lying between such ends and shiftable into engagement with either one thereof as desired, a third shaft journaled in said support and having driving engagement with said clutch member, and indicating means operatively connected with said third shaft and adapted to indicate the amount of movement imparted to either roll through said first-named shafts, said indicating means including a dial having portions designated for said rolls, respectively, a pointer movable with respect to said dial, a worm on said shaft, a gear driven therefrom, and a friction connection between said gear and pointer.

4. In roll-adjusting mechanism for calenders and the like, the combination of a suitable support, two shafts for effecting such adjustment having ends journaled in said support, a clutch member lying between such ends and shiftable into engagement with either one thereof as desired, a third shaft journaled in said support and having driving engagement with said clutch member, power means and manually operable means for driving said last-named shaft, means adapted alternatively to connect said driving means with said shaft, and indicating means operatively connected with said third shaft and adapted to indicate the amount of movement imparted to either roll through said first-named shafts.

5. In roll-adjusting mechanism for calenders and the like, the combination of a suitable support, two shafts for effecting such adjustment having ends journaled in said support, a clutch member lying between such ends and shiftable into engagement with either one thereof as desired, a third shaft journaled in said support and having driving engagement with said clutch member, an electric motor and a hand-wheel for driving said last-named shaft, a friction clutch adapted alternatively to connect said motor or said hand-wheel with said shaft, and indicating means operatively connected with said third shaft and adapted to indicate the amount of movement imparted to either roll through said first-named shafts.

Signed by me this 8th day of November, 1921.

PHILIP V. TIPPET.